Patented May 26, 1953

2,640,037

UNITED STATES PATENT OFFICE 2,640,037

FATTY ACID SALTS OF NITROGEN-CONTAINING POLYETHERS

Harvey L. Parry, Berkeley, and Quentin T. Wiles, Lafayette, Calif., assignors to Shell Development Company, Emeryville, Calif., a corporation of Delaware No Drawing. Application October 3, 1951, Serial No. 249,628

14 Claims. (Cl. 260—42)

This invention relates to a new material which is a fatty acid salt of a nitrogen-containing polyether. The invention also pertains to new compositions having this salt in admixture with a glycidyl polyether of a dihydric phenol, which compositions cure to valuable resinous products upon being heated.

It has been proposed heretofore to mix about 0.1 to 5% of various amines with glycidyl polyethers having a 1,2-epoxy equivalency greater than 1.0, and to heat the mixture so as to effect cure to hard resinous products. It has also been proposed to prepare soluble fusible preformed reaction products from reaction of a glycidyl polyether of a dihydric phenol having a 1,2-epoxy equivalency between 1.0 and 2.0 with a secondary amine containing a single nitrogen atom which is linked to two different carbon atoms while having in the reaction mixture at least 1.5 mols of the amine per epoxide equivalent of the polyether. Thus by having an excess of the secondary amine present upon reacting the amine with the glycidyl polyether, a product is formed which is soluble and fusible rather than being cured as is the case when only a small amount of amine is present. This preformed reaction product is useful as a curing agent for additional glycidyl polyether of a dihydric phenol. Thus upon admixing the preformed reaction product with a glycidyl polyether of a dihydric phenol having a 1,2-epoxy equivalency between 1.0 and 2.0, a composition is obtained which cures to a hard resin. However, the resinification occurs spontaneously upon mere admixture of the preformed reaction product with the glycidyl polyether without application of heat. While this phenomenon of spontaneous resinification is a useful occurrence in some applications, it is often not desired because it necessitates molding or shaping the composition into final form before resinification occurs. The resinification is irreversible, and of spontaneous character with only a relatively short time interval between mixing and resinification occurring. Consequently, it is difficult to apply the compositions in commercial methods of manufacture of resinous articles.

We have now discovered means for effectively overcoming this difficulty or fault of the above-described compositions. We have found that the tendency of the prior compositions to resinify spontaneously at ordinary temperature can be removed or effectively lessened by employing a fatty acid salt of the preformed reaction product in the compositions rather than the preformed product itself. This fatty acid salt is activated by heat so as to become a curing agent for the glycidyl polyether contained in the composition. Thus the compositions containing the salt in admixture with the glycidyl polyether can be stored at ordinary temperature for a long period of time, but by heating them to activating temperature, they resinify and cure to hard resins. Our invention enables control over the time of resinification which permits ready adaptation to commercial application in manufacturing of resinous articles.

In brief, our invention is the fatty acid salt of the soluble fusible reaction product or adduct from reaction of a glycidyl polyether of a dihydric phenol having a 1,2-epoxy equivalency between 1.0 and 2.0 with a secondary amine containing a single nitrogen atom which is linked directly to two different carbon atoms while employing in the reaction mixture at least 1.5 mols of the amine per epoxide equivalent of the polyether. The invention also includes a composition comprising such a fatty acid salt in admixture with a glycidyl polyether of a dihydric phenol having a 1,2-epoxy equivalency between 1.0 and 2.0. The glycidyl polyether from which the salt is derived and the glycidyl polyether present as such in the composition are not necessarily the same.

The glycidyl polyethers of a dihydric phenol are obtainable by reacting epichlorhydrin with a dihydric phenol in alkaline medium. The polyethers are prepared by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i. e., about 2% to 30%. The heating is continued for several hours to effect the reaction and the product is then washed free of salt and base. The product, instead of being a single simple compound, is generally a complex mixture of glycidyl polyethers, but the principal product may be represented by the formula

wherein $n$ is an integer of the series 0, 1, 2, 3 . . ., and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol. It contains a single divalent aromatic hydrocarbon radical from the dihydric phenol and has two glycidyl radicals linked thereto by ethereal oxygen atoms. More generally, the polyether is of more complex character having two or more aromatic hydrocarbon radicals alternating with glyceryl groups in a chain which are linked together by intervening ethereal oxygen atoms, and predominantly has glycidyl groups in terminal position in the chain.

The glycidyl polyethers of a dihydric phenol used in the invention have a 1,2-epoxy equivalency greater than 1.0. By the epoxy equivalency reference is made to the number of 1,2-epoxy groups

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2. However, in all cases it is a value greater than 1.0. The 1,2-epoxy equivalency of the polyethers is thus a value between 1.0 and 2.0.

The 1,2-epoxide value of the glycidyl polyether is determined by heating a weighed sample of the ether with an excess of 0.2N pyridinium chloride in chloroform solution at the boiling point under reflux for 2 hours whereby the pyridinium chloride hydrochlorinates the epoxy groups to chlorhydrin groups. After cooling, the excess pyridinium chloride is back-titrated with 0.1N sodium hydroxide in methanol to the phenolphthalein end point. This method is used for obtaining all epoxide values discussed herein.

As is explained hereinafter more fully, the preformed reaction products from reaction of a secondary amine with a glycidyl polyether are obtained with use of at least 1.5 mols of the amine per epoxide equivalent of the glycidyl polyether. By the term epoxide equivalent, reference is made to the weight of glycidyl polyether which contains and is equivalent to one 1,2-epoxy group. For example, the glycidyl polyether of 2,2-bis-(4-hydroxyphenyl) propane designated herein as Polyether A, has a measured epoxy value of 0.50 epoxy equivalents per 100 grams and a measured molecular weight of 370. The 1,2-epoxy equivalency of Polyether A is therefore 1.85 and the epoxide equivalent weight is 200. In preparing the soluble and fusible reaction product, there is used at least 1.5 mols of secondary amine per 200 parts by weight of Polyether A.

Any of the various dihydric phenols is used in preparing the polyethers including mononuclear phenols such as resorcinol, catechol, hydroquinone, methyl resorcinol, etc.; or polynuclear phenols like 2,2-bis(4-hydroxyphenol) propane which is termed bis-phenol herein for convenience, 4,4'-dihydroxybenzophenone, bis(4-hydroxyphenyl) methane, 1,1 - bis(4 - hydroxyphenyl) ethane, 1,1-bis(4-hydroxyphenyl) isobutane, 2,2-bis(4-hydroxyphenyl) butane, 2,2-bis(4-hydroxy-2-methylphenyl) propane, 2,2-bis(4-hydroxy-2-tertiary-butylphenyl) propane, 2,2-bis(2-hydroxynaphthyl) pentane, 1,5-dihydroxynaphthalene, etc.

Preferred polyethers are prepared from 2,2-bis(4-hydroxyphenyl) propane. They contain a chain of alternating glyceryl and 2,2-bis(4-phenylene) propane radicals separated by intervening ethereal oxygen atoms and have a 1,2-epoxy equivalency between 1.0 and 2.0, a molecular weight of about 340 to 624, and an epoxide equivalent weight of about 175 to 400. More generally, it is preferred to employ glycidyl polyether of a dihydric phenol which has a value for $n$ in the above-mentioned structural formula of about 0 to 2.

The glycidyl polyethers will be more fully understood from consideration of the following described preparations and the properties of the products.

Polyether A

Glycidyl polyethers of a dihydric phenol having lowest molecular weight, i. e., $n$ approaching or equaling zero, are best prepared by reacting the dihydric phenol and base with epichlorhydrin in the presence of a large excess of epichlorhydrin such as at least 5 mols of epichlorhydrin per mol of the phenol.

Bis-phenol is dissolved in epichlorhydrin in the proportion of 5,130 parts (22.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove the exothermic heat of reaction. The control is such that the temperature rises only to about 100° C. When the exorthermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' Mercury Method softening point of 9° C., an average molecular weight of 370 by ebullioscopic measurement in ethylene dichloride, and an epoxide value of 0.50 epoxy equivalents per 100 grams. It has an epoxide equivalent weight of 200 and a 1,2-epoxy equivalency of 1.85. The product is designated herein as Polyether A.

*Polyether B*

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes has elapsed, there is added during an additional 15 minutes' time a solution consisting of 5.62 parts of sodium hydroxide in 11.7 parts of water. This causes the temperature to rise to 63° C. Washing with water at 20° C. to 30° C. temperature is started 30 minutes later and continued for 4½ hours. The product is dried by heating to a final temperature of 140° C. in 80 minutes, and cooled rapidly. At room temperature, the product is an extremely viscous, semi-solid having a softening point of 27° C. by Durrans' Mercury Method, an epoxide equivalent weight of 245 and a molecular weight of 460. The 1,2-epoxy equivalency is 1.88.

*Polyether C*

Polyethers of higher molecular weight are prepared by using smaller ratios of epichlorhydrin to bis-phenol. In a vessel fitted with an agitator, 228 parts (1 mol) of bis-phenol and 75 parts (1.88 mols) sodium hydroxide as a 10% aqueous solution are introduced and heated to about 45° C. whereupon 145 parts (1.57 mols) of epichlorhydrin are rapidly added while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 69° C. The measured molecular weight of the product is 900 and it has an epoxide value of 0.20 epoxy equivalents per 100 grams. The epoxide equivalent weight is 500, and the 1,2-epoxy equivalency is 1.8.

*Polyether D*

This glycidyl polyether is prepared in like manner to that of Polyether C except that for each mol of bis-phenol there is employed 1.22 mols of epichlorhydrin and 1.37 mols of sodium hydroxide. The resulting polyether has a softening point of 98° C. by Durrans' Mercury Method, a molecular weight of 1400 as measured ebullioscopically in ethylene dichloride, and an epoxide value of 0.103 epoxy equivalents per 100 grams. The epoxide equivalent weight is 970, and the 1,2-epoxy equivalency is 1.44.

*Polyether E*

Glycidyl polyethers of still higher molecular weight are most easily prepared by heating together and reacting a lower polyether with additional dihydric phenol. 100 parts of Polyether D are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, an epoxide value of 0.05 epoxy equivalent per 100 grams, an epoxide equivalent weight of 2000, and a 1,2-epoxy equivalency of 1.45.

Any of the various secondary amines are used in preparing the preformed reaction products provided they contain only a single nitrogen atom which is linked directly to two different carbon atoms. Since the amine is a secondary amine, it necessarily also has a single hydrogen atom linked directly to the nitrogen atom. Among representative compounds are dimethylamine, diethylamine, dipropylamine, dibutylamine, diisobutylamine, di-(sec-butyl-amine di-(tert-butyl) amine, dioctylamine, dinonylamine, distearylamine, diallylamine, dioleylamine, dicyclohexylamine, and dibenzylamine. Besides such symmetrical secondary amines, the amine can be asymmetrical as is the case with typical compounds like methylethylamine, methylisoamylamine, ethylpropylamine, methylallylamine, methylpropargylamine, ethylcyclohexylamine, methylbenzylamine, and o-tolylnaphthylamine. The secondary amine can also have the nitrogen atom as a member of a ring as in such representative compounds as trimethyleneimine, pyrrole, pyrrolidine, 2 - methylpyrrolidine, piperidine, tetrahydropyridine, 2-methylpiperidine, 4-methylpiperidine, 2,6-dimethylpiperidine, and decahydroquinoline. The amine preferably contains only the elements carbon and hydrogen besides the single secondary amino nitrogen atom which is preferably linked directly to two different aliphatic carbon atoms. It is also preferred to employ an amine of 2 to 10 carbon atoms. While ordinarily the reaction product is prepared from a single amine, mixtures of two or more different amines may be used if desired.

The soluble and permanently fusible reaction product is prepared by bringing together and mixing the glycidyl polyether with the amine whereupon chemical reaction between the two reactants begins. The primary reaction is the chemical coupling of the amine to the epoxy group in the glycidyl radicals contained in the polyether so that 3-amino-2-hydroxypropyl and/or 2-amino-3-hydroxypropyl groups are formed wherein the amino group is a tertiary amino group. There also occurs a very minor amount of reaction of the glycidyl groups with alcoholic hydroxyl groups contained in the glycidyl polyether. Although the coupling reaction between the glycidyl polyether and the amine occurs upon bringing the two reactants together at room temperature (15–25° C.), it is in general preferred to heat the reaction mixture and at least complete the reaction at an elevated temperature. For this purpose, a temperature of about 50 to 150° C. is suitable. The reaction is usually effected under atmospheric pressure although superatmospheric pressure may be used especially with low boiling amines like dimethylamine.

In order that the desired soluble fusible reaction product will be obtained instead of a cured resinous mass, it is necessary that an important detail be observed, namely, that a proper proportion of reactants be used. The soluble and permanently fusible product is obtained when the glycidyl polyether of a polyhydric phenol is reacted with the secondary amine while having present at least 1.5 mols of the amine per epoxide equivalent of the polyether. More preferably there is used from 2 to 5 mols of amine per epoxide equivalent. Aside from matters of economy, there is no particular upper limit to the ratio. Only about one mol of amine actually reacts and chemically combines with one epoxide equivalent of the polyether. The unreacted excess amine is separated and removed from the reaction product as completely as possible by usual methods such as distillation or extraction. Where appropriate, steam distillation, vacuum pumping and purging with inert gas are used.

In view of the critical character of the proportion of reactants, it is preferred to add the glycidyl polyether to the mass of the amine. This prevents local regions of improper proportions of ingredients.

With glycidyl polyethers which are very viscous or solid at ordinary temperature, the use of heat so as to have the polyether in a mobile molten condition during mixing is desirable. The same is true with normally solid amines. It is also advantageous to effect the reaction in an inert organic solvent for the reactants and product. Dioxane is particularly useful for this purpose since it possess the desired solvency and the formed product may be readily separated therefrom as a precipitate upon addition of water to the solution. Another useful solvent is diethyl ether.

The preformed products prepared with use of the excess of secondary amine are viscous liquid to solid materials. They are characterized by being soluble in a variety of organic solvents such as dioxane, diethyl ether, methanol, acetone, chloroform and toluene. The products are also permanently fusible in that they do not harden and resinify upon being heated at say 50° C. to 100° C. for extended periods of time such as 24 hours. In contrast, the resins of the prior art obtained by curing glycidyl polyethers of dihydric phenols with a small amount of a secondary amine are insoluble in organic solvents and are infusible.

The soluble fusible preformed reaction products from reaction of excess of the secondary amine with the glycidyl polyether of a dihydric phenol are chemical adducts of the amine with the polyether. They are fully described and claimed in copending application, Serial No. 218,094, filed March 28, 1951. In order that the fatty acid salts of these preformed reaction products, with which the present invention is concerned, will be better understood, preparation and properties of some particular adducts are described below. The parts are by weight.

*Adduct A*

To 570 parts of diethylamine contained in a flask equipped with a stirrer, condenser and thermometer is added a solution of 500 parts of Polyether A in 500 parts of dioxane. A slight exothermic reaction ensues and the stirred reaction mixture is immediately heated to reflux temperature of 55–60° C. where it is held for 3 hours. The reaction mixture is then poured into 3000 parts of water and the sticky reaction product repeatedly washed with water to remove as much unreacted amine and dioxane as possible. The product is next dissolved in some diethyl ether and the solution is washed with water until the effluent is substantially neutral to alkacid paper. The ethereal solution is then dried with calcium sulfate and the ether removed by distillation in vacuo. The product in amount of 378 parts is a very viscous liquid which becomes quite fluid upon heating to 60° C. Analysis of the product gives the following results:

Nitrogen _____ per cent__ 5.2
Carbon _____ do____ 71.7
Hydrogen _____ do____ 9.4
Molecular weight _____ 526
Durrans' Mercury Method softening point
°C__ 13.6

*Adduct B*

A solution of 220 parts of Polyether A in 530 parts of dioxane is charged to a closed kettle fitted with a condenser employing acetone which circulates through Dry Ice as cooling medium. About 400 parts of dimethylamine are introduced and the reaction mixture is warmed for about 24 hours, while refluxing at a kettle temperature of 22 to 23° C. Reflux is then discontinued and the reaction mixture is allowed to stand at room temperature for an additional 44 hours. A 10 part sample is removed. The bulk of the product is then heated slowly in a distillation flask to 165° C. while decreasing the pressure to 0.5 mm. during a 30 minute period in order to remove any residual dimethylamine. The product in amount of 255 parts is a viscous liquid which is quite fluid at 60° C. Analysis of the product gives the following results:

Per cent nitrogen_____ 6.1
Molecular weight_____ 487

*Adduct C*

To 438 parts of diethylamine heated to 60° C. and contained in a flask fitted with a stirrer, condenser and thermometer is added a solution of 500 parts Polyether B in 500 parts of dioxane. An exothermic reaction ensues with the temperature rising to about 70° C. The reaction mixture is heated and held at reflux temperature of 55 to 60° C. for 3 hours. The solution is filtered and the excess diethylamine and dioxane removed under a vacuum of 2 to 3 mm. pressure at 50 to 73° C. The product in amount of 454 parts is a very viscous liquid which becomes quite fluid at 60° C. The product analyzes as follows:

Nitrogen _____ per cent__ 4.2
Carbon _____ do____ 72.5
Hydrogen _____ do____ 8.9
Molecular weight _____ 620

*Adduct D*

Piperidine in amount of 400 parts is placed in a flask fitted with a condenser and warmed gently with stirring to about 40° C. There are then slowly added 125 parts of Polyether A while holding the temperature to about 60° C. The reaction mixture is next subjected to distillation up to a temperature of 80° C. in a Claisen flask to remove excess piperidine. Water is added and residual piperidine steam distilled out with agitation. The product is washed with water at about 100° C. until free of piperidine odor and then dried in vacuo at 150° C. under 10 mm. pressure for 2 hours. The product is of almost solid consistency, but becomes quite fluid on heating to 60° C. Analysis gives the following results:

Nitrogen _____per cent\_\_ 5.1
Molecular weight _____ 540

The fatty acid salts of the invention are prepared by simply mixing the fatty acid with an adduct of the secondary amine and glycidyl polyether whereupon the desired salt forms. The mixing is conveniently effected with the reactants in solution in an organic solvent. For this purpose, dioxane or diethyl ether are suitable. Heat evolves as a result of the neutralization reaction and it is usually desirable to apply cooling in order to keep below about 60° C. With use of a low boiling solvent such as diethyl ether, the reaction can be effected in a vessel fitted with a reflux condenser in order to avoid loss of the ether in those cases where the heat of neutralization increases the temperature up to the boiling point of the reaction mixture. Control of the temperature can also be effected by regulation of rate of addition of one reactant to the other. The reaction mixture is stirred in order to effect thorough mixing of the reactants.

When employed as heat-activated curing agents in the compositions of the invention, it is usually desired that the fatty acid salt of the amine adduct be neutral, i. e., have each amino nitrogen atom neutralized with a molecule of fatty acid. It is also preferable in using partial salts that they be of non-acidic variety, i. e., salts obtained by reacting less than equivalent amount of the fatty acid with the amine-polyether adduct.

The salt of the amine-polyester adduct can be the salt of any fatty acid although the salt of a fatty acid containing 2 to 12 carbon atoms in the acid portion of the molecule is preferred. Thus the fatty acid can be saturated, olefinically unsaturated and/or acetylenically unsaturated. The fatty acid has the carboxyl group linked to a hydrogen atom or an aliphatic hydrocarbon radical. The fatty acids include, for example, such representative compounds as formic acid, acetic acid, propionic acid, acrylic acid, propiolic acid, butyric acid, isobutyric acid, valeric acid, caproic acid, caprylic acid, capric acid, 2-ethylhexoic acid, lauric acid, sorbic acid, myristic acid, palmitic acid, stearic acid, behenic acid, oleic acid, linoleic acid, linolenic acid, and the like, as well as mixtures thereof. Saturated fatty acid salts are preferred. However, the invention includes any fatty acid salt of any adduct of a secondary mono-amine having the nitrogen atom linked directly to two different carbon atoms with a glycidyl polyether of a polyhydric phenol having a 1,2-epoxy equivalency greater than 1.0. A fatty acid salt of the dimethylamine adduct of the diglycidyl diether of 2,2-bis(4-hydroxyphenyl)-propane is preferred. Reference is made to a fatty acid salt of the di(3-dimethylamino-2-hydroxypropyl)-diether of 2,2-bis(4-hydroxyphenyl)propane, especially the neutral acetic acid salt thereof.

The salts of the invention vary from viscous liquids to solids at ordinary temperature of about 20 to 25° C. They are particularly useful as heat-activated curing agents for glycidyl polyether of a dihydric phenol having a 1,2-epoxy equivalency between 1.0 and 2.0. In such compositions of the invention, the salt is present in minor proportion with the glycidyl polyether. Usually the compositions contain such a proportion of the salt in admixture with the glycidyl polyether that the composition contains about 0.1 to 4% by weight of nitrogen. More preferably, the proportion is such that the composition contains about 0.5 to 2% of nitrogen.

The compositions of the invention are prepared by mixing the salt and glycidyl polyether together. The particular technique employed for this purpose will vary to some extent depending primarily upon the fluidity of the glycidyl polyether at ordinary or slightly elevated temperature which is below the temperature which activates the salt so as to cause it to gel the glycidyl polyether. Thus in preparing a composition from Polyether A, the salt can be stirred directly into the polyether at ordinary temperature of say 20 to 25° C. because the polyether has adequate fluidity at this temperature. With less fluid polyethers such as Polyether B, it is convenient to warm the polyether to about 40° C. in order to obtain sufficient fluidity to permit easy incorporation of the salt. With solid or very viscous glycidyl polyethers, a solvent is conveniently used. A variety of substances are suitable for this purpose including ketones such as acetone, methyl ethyl ketone, methyl isobutyl ketone, isophorone, diacetone alcohol, etc.; ether alcohols such as methyl, ethyl or butyl ether of ethylene glycol or diethylene glycol; and chlorinated solvents such as trichloropropane, chloroform, etc.

Solvent-free compositions suitable for molding operations and the like are obtained with use of a volatile solvent which is evaporated from a solution of the composition containing the glycidyl polyether and the salt. The evaporation is effected at a temperature below that which activates the salt curing agent, and premature gelation is thus avoided. A temperature below about 50° C. is satisfactory for this purpose.

The compositions of the invention cure to hard resinous materials in short time upon being heated at least up to the activating temperature of the salt. This minimum temperature will vary somewhat with the particular salt contained in the composition. Thus a composition containing some salts give a very tight cure as low as about 65° C., but other salts require higher temperatures. Ordinarily temperatures above about 250° C. are avoided owing to decomposition of the materials. As a general matter, the compositions are cured at a temperature of about 80 to 200° C. As the curing temperature is increased, the time required to obtain a tight cure is decreased. Use of longer times than the minimum at a particular activating temperature may be employed if desired, but it is usually preferred for purposes of efficiency to correlate the time of cure with the temperature so that the minimum for a tight cure is employed.

The resulting cured resinous product is very valuable in being a hard tough material which is resistant against the destructive action of organic solvents and alkalies. The compositions of the invention are thus suitable for use in a variety of applications, such as the manufacture of adhesives, varnishes, enamels, casting compositions, potting compounds, and molded articles of manufacture. Depending upon the particular application to which the compositions are put, the compositions may also contain, besides the glycidyl polyether and the salt, various other materials, such as pigments, fillers, plasticizers, and other resins.

The following examples are given for the purpose of illustrating the invention, but are not to be construed as limitative thereof.

Example 1

About 72 parts of Polyether A dissolved in 260 parts of dioxane were poured into another portion of 260 parts of dioxane through which dimethylamine had been bubbled for one-half hour at about 15° C. After addition of the polyether, bubbling in of dimethylamine was continued for a total time of 2 hours. Upon completion of the formation of the amine-polyether adduct, which was predominantly the di-(3-dimethylamino-2-hydroxypropyl)diether of 2,2-bis(4-hydroxyphenyl)propane, excess unreacted dimethylamine was removed from the reaction mixture by warming.

The acetic acid salt was obtained by exactly neutralizing the amine adduct in the dioxane solution with glacial acetic acid. The dioxane was removed from the salt solution by evaporation under vacuum.

A composition was prepared by mixing 18.3 parts of the salt with 100 parts of Polyether A. For purpose of comparison, a second composition was prepared by mixing 15 parts of the amine adduct instead of the salt thereof with 100 parts of Polyether A. Each composition contained the same amount of added amine adduct, 15 parts per 100 parts of Polyether A. It was found that a portion of the second composition which contained the un-neutralized amine adduct, gelled in two hours at room temperature of about 23° C. On the other hand, a portion of the composition containing the salt displayed no tendency to gel even after 24 hours' time at room temperature.

The time for gelation of the composition containing the salt was also determined at 80° C. and at 100° C. It was found that at 80° C., the gel time was 45 minutes, and that by heating for a total time of one hour, a hard tough resin was obtained having a Barcol hardness of 28. The portion of the composition heated at 100° C. was found to have gelled in 30 minutes, and after heating for a total time of 45 minutes, a hard tough resin was produced which had a Barcol hardness of 13.

Example 2

Adduct B, described hereinbefore, in amount of 200 parts was dissolved in an equal weight of diethyl ether and filtered to remove a small amount of insoluble gel particles. The filtrate was cooled to about 5° C. and poured into a similarly cooled solution of 46.8 parts of acetic acid in about 150 parts of diethyl ether with vigorous stirring. The formed salt separated as a gummy material. The bulk of the ether was decanted and the gummy salt was washed by macerating three times with fresh ether. The residual ether and very small excess of acetic acid were removed by evaporation up to a temperature of about 55° C. at a pressure of about 5 mm. pressure.

A composition was prepared by mixing 18.5 parts of the salt with 100 parts of Polyether A. The composition cured to a hard tough resin in 2 hours at 80° C. Another composition was prepared by mixing 15 parts of Adduct B, the free amine, with 100 parts of Polyether A. This second composition cured to a hard resin in 2 hours at 60° C. The extent of water absorption of the two resins was determined by immersing them in water for intervals of time. It was found that the resin from the composition containing the free amine adduct absorbed water to the extent of 0.20% in 24 hours and 0.48% in 168 hours while the resin from the composition containing the acetic acid salt absorbed 0.13% in 24 hours and 0.42% in 168 hours. Thus in spite of the fact that the resin from the composition containing the salt would be expected to have a greater extent of water absorption, it was actually found to have a lesser extent.

We claim as our invention:

1. A fatty acid salt of the soluble fusible reaction product from reaction of a glycidyl polyether of a dihydric phenol having a 1,2-epoxy equivalency between 1.0 and 2.0 with a secondary amine while having in the reaction mixture at least 1.5 mols of said amine per epoxide equivalent of said polyether, said secondary amine containing a single nitrogen atom which is linked directly to two different carbon atoms and containing besides the single nitrogen atom only the elements carbon and hydrogen.

2. A fatty acid salt of the soluble fusible reaction product obtained by reacting a secondary amine of 2 to 10 carbon atoms with a polyether while having present at least 1.5 mols of said amine per epoxide equivalent of said polyether, said secondary amine containing a single nitrogen atom which is linked directly to two different carbon atoms and containing besides the single nitrogen atom only the elements carbon and hydrogen, said polyether being a glycidyl polyether of 2,2-bis(4-hydroxyphenyl)propane having a 1,2-epoxy equivalency between 1.0 and 2.0, and said fatty acid containing 2 to 12 carbon atoms.

3. The neutral salt of a fatty acid and the soluble fusible reaction product from reaction of a dialkyl secondary monoamine with a glycidyl polyether of a dihydric phenol having a 1,2-epoxy equivalency between 1.0 and 2.0 while having present from 2 to 5 mols of said amine per epoxide equivalent of said polyether.

4. The acetic acid neutral salt of the soluble fusible reaction product from reaction of dimethylamine with a glycidyl polyether of a dihydric phenol having a 1,2-epoxy equivalency of between 1.0 and 2.0 while having present at least 1.5 mols of said amine per epoxide equivalent of said polyether.

5. The acetic acid neutral salt of the soluble fusible reaction product from reaction of dimethylamine with a glycidyl polyether of 2,2-bis(4-hydroxyphenyl)propane having a 1,2-epoxy equivalency between 1.0 and 2.0 and a molecular weight of about 340 to 624 while having present from 2 to 5 mols of said amine per epoxide equivalent of said polyether.

6. The acetic acid neutral salt of the soluble fusible reaction product from reaction of diethylamine with a glycidyl polyether of 2,2-bis(4-hydroxyphenyl)propane having a 1,2-epoxy equivalency between 1.0 and 2.0 and a molecular weight of about 340 to 624 while having present from 2 to 5 mols of said amine per epoxide equivalent of said polyether.

7. The acetic acid neutral salt of the soluble fusible reaction product from reaction of piperidine with a glycidyl polyether of 2,2-bis(4-hydroxyphenyl)propane having a 1,2-epoxy equivalency between 1.0 and 2.0 and a molecular weight of about 340 to 624 while having present from 2 to 5 mols of said amine per epoxide equivalent of said polyether.

8. A composition comprising a glycidyl polyether of a dihydric phenol having a 1,2-epoxy equivalency between 1.0 and 2.0 in admixture with a minor proportion of a fatty acid salt of the soluble fusible reaction product from reaction of a glycidyl polyether of a dihydric phenol having a 1,2-epoxy equivalency between 1.0 and 2.0 with a secondary amine while having in the reaction mixture at least 1.5 mols of said amine per epoxide equivalent of said polyether, said secondary amine containing a single nitrogen atom which is linked directly to two different carbon atoms and containing besides the single nitrogen atom only the elements carbon and hydrogen.

9. A composition comprising a glycidyl polyether of 2,2-bis(4-hydroxyphenyl)propane having a 1,2-epoxy equivalency between 1.0 and 2.0 in admixture with a fatty acid salt of the soluble fusible reaction product obtained by reacting a secondary amine of 2 to 10 carbon atoms with a polyether while having present at least 1.5 mols of said amine per epoxide equivalent of said polyether, said secondary amine containing a single nitrogen atom which is linked directly to two different carbon atoms and containing besides the single nitrogen atom only the elements carbon and hydrogen, said polyether being a glycidyl polyether of 2,2-bis(4-hydroxyphenyl)propane having a 1,2-epoxy equivalency between 1.0 and 2.0, and said fatty acid containing 2 to 12 carbon atoms, the salt being present in the mixture in such proportion that the composition contains about 0.1 to 4% nitrogen.

10. A composition comprising a glycidyl polyether of a dihydric phenol having a 1,2-epoxy equivalency between 1.0 and 2.0 in admixture with the neutral salt of a fatty acid and the soluble fusible reaction product from reaction of a dialkyl secondary monoamine with a glycidyl polyether of a dihydric phenol having a 1,2-epoxy equivalency between 1.0 and 2.0 while having present from 2 to 5 mols of said amine per epoxide equivalent of said polyether, said salt being present in the mixture in such proportion that the composition contains about 0.1 to 4% nitrogen.

11. A composition comprising a glycidyl polyether of a dihydric phenol having a 1,2-epoxy equivalency between 1.0 and 2.0 in admixture with about an added 5 to 30% of the acetic acid neutral salt of the soluble fusible reaction product from reaction of dimethylamine with a glycidyl polyether of a dihydric phenol having a 1,2-epoxy equivalency of between 1.0 and 2.0 while having present at least 1.5 mols of said amine per epoxide equivalent of said polyether.

12. A composition comprising a glycidyl polyether of 2,2-bis(4-hydroxyphenyl)propane in admixture with about an added 5 to 30% of the acetic acid neutral salt of the soluble fusible reaction product from reaction of dimethylamine with a glycidyl polyether of 2,2-bis(4-hydroxyphenyl)propane while having present from 2 to 5 mols of said amine per epoxide equivalent of the polyether, each of said polyethers having a 1,2-epoxy equivalency between 1.0 and 2.0 and a molecular weight of about 340 to 624.

13. A composition comprising a glycidyl polyether of 2,2-bis(4-hydroxyphenyl)propane in admixture with about an added 5 to 30% of the acetic acid neutral salt of the soluble fusible reaction product from reaction of diethylamine with a glycidyl polyether of 2,2-bis(4-hydroxyphenyl)propane while having present from 2 to 5 mols of said amine per epoxide equivalent of the polyether, ether of said polyethers having a 1,2-epoxy equivalency between 1.0 and 2.0 and a molecular weight of about 340 to 624.

14. A composition comprising a glycidyl polyether of 2,2-bis(4-hydroxyphenyl)propane in admixture with about an added 5 to 30% of the acetic acid neutral salt of the soluble fusible reaction product from reaction of piperidine with a glycidyl polyether of 2,2-bis(4-hydroxyphenyl)propane while having present from 2 to 5 mols of said amine per epoxide equivalent of the polyether, each of said polyethers having a 1,2-epoxy equivalency between 1.0 and 2.0 and a molecular weight of about 340 to 624.

HARVEY L. PARRY.
QUENTIN T. WILES.

No references cited.